Jan. 8, 1963  W. N. POUNDSTONE  3,072,242
SELF TRAINING ROLLER ASSEMBLIES FOR ENDLESS BELT CONVEYORS
Filed Oct. 20, 1959  3 Sheets-Sheet 1

INVENTOR.
WILLIAM N. POUNDSTONE
BY Stanley J Price
his ATTORNEY

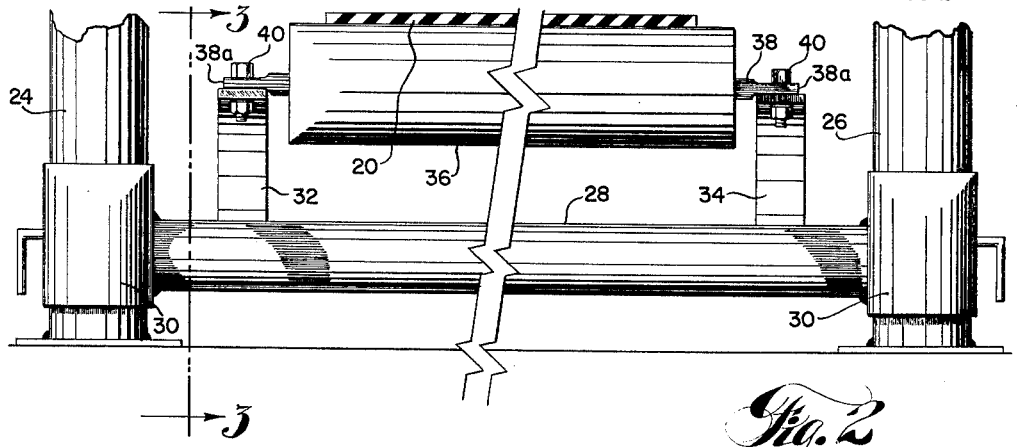
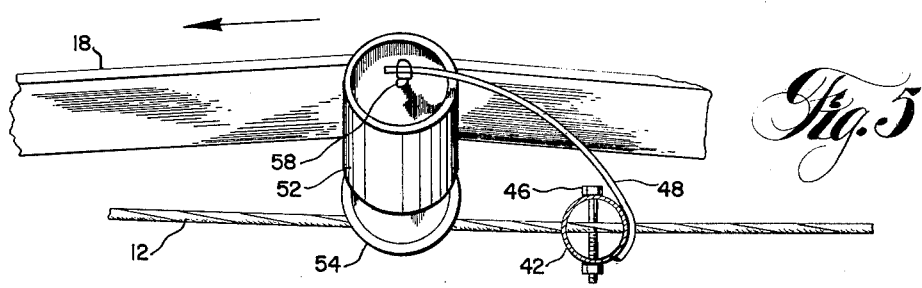
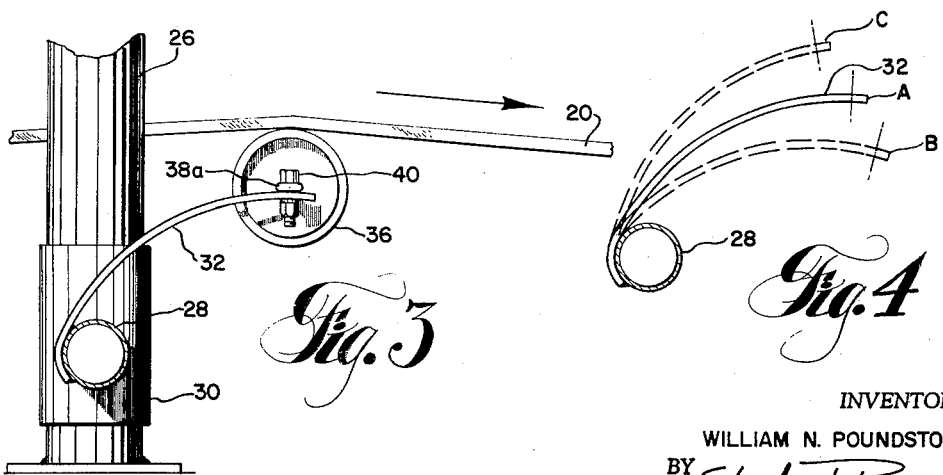

Jan. 8, 1963 W. N. POUNDSTONE 3,072,242
SELF TRAINING ROLLER ASSEMBLIES FOR ENDLESS BELT CONVEYORS
Filed Oct. 20, 1959 3 Sheets-Sheet 3

INVENTOR.
WILLIAM N. POUNDSTONE
BY Stanley J Price
his ATTORNEY

United States Patent Office 3,072,242
Patented Jan. 8, 1963

3,072,242
SELF TRAINING ROLLER ASSEMBLIES FOR
ENDLESS BELT CONVEYORS
William N. Poundstone, Morgantown, W. Va., assignor to
Consolidation Coal Company, Pittsburgh, Pa., a corporation of Pennsylvania
Filed Oct. 20, 1959, Ser. No. 847,593
7 Claims. (Cl. 198—192)

This invention relates to an endless belt type conveyor assembly and more particularly to self training idler roller assemblies utilized to support the endless belt of the conveyor assembly.

Belt conveyors consist generally of an endless belt disposed horizontally over a series of idler rollers. The belt is driven by a belt drive device. The belt has a conveying reach which carries material in the desired direction and a return reach which returns the empty portion of the belt to provide a continuous path for the endless belt.

One of the major problems in the smooth operation of endless belt type conveyors is to maintain the belt on a true track. It is important to maintain the belt tracking the course originally laid out for the conveyor such that there is little or no deviation of the belt from the desired belt track. When the belt conveyor is placed in operation, a desired belt course is selected and the stands and supports which form the conveyor assembly are laid out upon that course. As a result of slight inaccuracies in selecting the original course and as a result of variable loads carried by the conveying reach of the belt, the belt may not maintain its true track throughout the operation of the conveyor unless some means is provided to compensate for any tendency of the belt to deviate from the desired track. It is desirable for trouble free operation to provide a means to compensate for any lateral belt deviation and thereby continually train the belt along its original, desired course.

It has been found that one of the most efficient methods of training a conveyor belt is to shift the axis of the roller upon which the belt rolls. If the axis of a conveyor idler roller is shifted in a horizontal plane so that one end of the axis is advanced in the direction of belt travel while the other end is retarded against the direction of belt travel, the belt will move or tend to move laterally across the roller toward the retarded end of the axis. It has also been found that if one end of an idler roller axis is lowered while the other end is raised slightly, the belt has a tendency to track laterally upward toward the raised end of the roller axis. It has been found that this type of training action depends upon the loading conditions upon the belt. The result that raising or lowering the ends of an idler roller axis has on the training of a conveyor belt is not as effective as that which occurs when the end of the roller axis is shifted in the direction of belt travel or retarded against the direction of belt travel. Accordingly, one of the most efficient methods of training a conveyor belt is to provide for the shifting of the idler roller axes in a horizontal plane in response to deviations of the belt. Thus, if the idler roller axes can be made to shift in the proper manner in response to belt deviations, the belt can be maintained on its desired track.

A variety of forms of idler rollers which provide for shifting the axis of the roller in response to belt deviations are well known in the conveyor art. Generally, these "self-training" idlers are more complicated in construction and more expensive than the conventional fixed course "non-training" idler rollers utilized on the conveyor belt assemblies. Because of their more expensive construction, these specially designed idler rollers are interspersed in a conveyor belt assembly in a ratio of one belt training idler to four or five conventional idler rollers. Thus, the self-training idler roller assemblies are provided to produce a large amount of belt compensation to compensate for the cumulative effects of any belt misalignment caused by the four or more conventional idler roller assemblies ahead of the self-training idler roller.

The present invention contemplates the use of idler roller assemblies each of which provides a small but positive corrective training action to the belt. Further, the idler roller assemblies of the present invention may be simply and economically constructed so that the use of the present self-training idler rollers will not place the conveyor operator at an economic disadvantage. Thus, the self-training idler rollers of the present invention may be substituted for the conventional non-training idler rollers and for the more expensively constructed self-training idler rollers conventionally used in combination on conveyor assemblies.

At the present time flexible side frame conveyor assemblies such as wire rope strand supported endless belt conveyors are becoming more popular because of their relatively light weight and the ease with which they are assembled and disassembled. In many instances, the conveyor belt training problems are more severe in wire rope supported endless belt conveyors than they are with the more common rigid metal frame supported conveyors. The present invention also contemplates the construction of the self-training idler roller assemblies which may be utilized with equal facility in either wire rope strand supported belt conveyors or in the more common rigid metal frame supported conveyors. Thus, a wire rope strand supported conveyor equipped with the idler roller assemblies of the present invention will provide for efficient training of the conveyor belt.

With the foregoing considerations in mind, it is a primary object of the present invention to provide an improved self-training idler roller assembly for endless belt type conveyors.

It is another object of the present invention to provide a self-training roller assembly in which a small but positive corrective action takes place upon the slightest lateral belt deviation.

It is another object of the present invention to provide an improved self-training idler roller assembly which operates efficiently on a wire rope strand supported conveyor.

Still another object of the present invention is to provide a roller support with self-training action which may be utilized to support both the troughing conveying reach rollers and the non-troughing return reach idler rollers of a conveyor belt assembly.

A further object of the present invention is to provide a self-training idler roller support which may be utilized with either a rigid shaft troughing roller or a flexible shaft troughing idler roller.

Another object of the present invention is to provide self-training idler rollers which may be constructed economically so that each roller in a conveyor assembly may produce a self-training action without the overall conveyor assembly being economically prohibitive.

Another object of the present invention is to provide a wire rope strand supported conveyor which efficiently trains the conveyor belt along a desired predetermined course.

These and still other objects of this invention will become apparent as this description proceeds in conjunction with the accompanying drawings.

In the drawings:

FIGURE 2 is an enlarged elevation of a portion of the wire rope supporting standard shown in FIGURE 1 showing details of the return reach idler roller assembly construction.

FIGURE 3 is a partial section taken along line 3—3 of FIGURE 2.

FIGURE 4 is a diagrammatic representation of a roller shaft supporting member.

FIGURE 5 is an end elevation of the troughing idler roller assembly shown in FIGURE 1.

Figure 1:
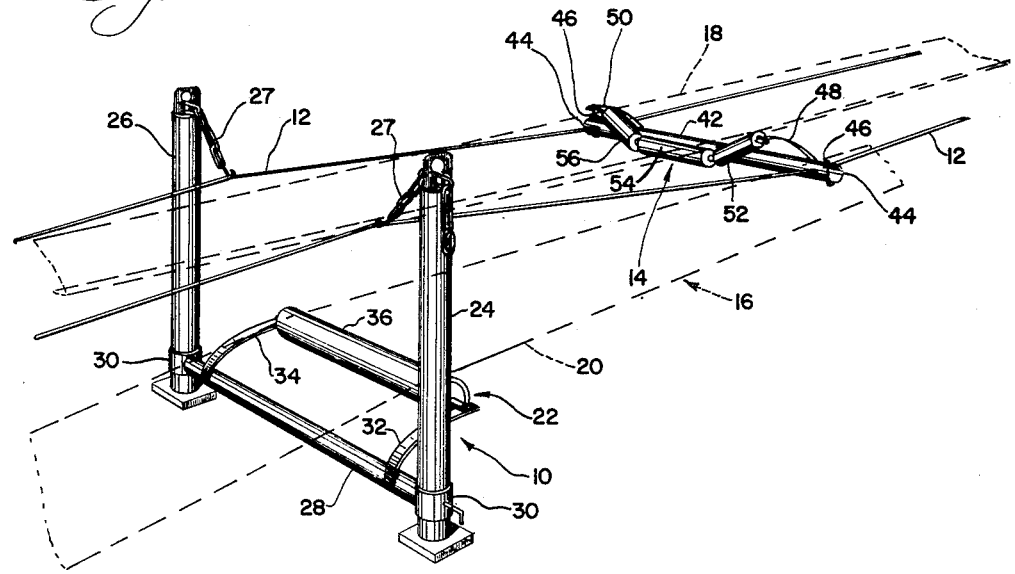
FIGURE 1 is a perspective view of a portion of a wire rope strand supported endless belt conveyor.

Referring now to the drawings, in which like reference numbers refer to similar elements throughout all of the figures, the invention will be described in detail. FIGURE 1 is a perspective view of a portion of an endless belt conveyor embodying the present invention. As seen in FIGURE 1, a supporting standard 10 supports wire rope strands 12 which in turn support the troughing roller assembly 14. A conveyor belt 16 (shown in phantom lines) has a conveying reach 18 and a return reach 20 supported by the troughing roller assembly 14 and the return reach roller assembly 22 respectively.

The supporting standard 10 is formed from vertical standards 24 and 26 connected by a cross member or base member 28. The base member 28 serves to maintain the vertical standards 24 and 26 the proper distance apart and also serves as a base for the return reach roller assembly 22. The vertical standards 24 and 26 have chains 27 secured to their upper end portions to support wire ropes 12. The exact construction of the vertical standards 24 and 26 forms no part of the present invention, but rather, is the subject of my copending U.S. patent application Serial No. 690,684, filed October 17, 1957. Reference may be had to patent application Serial No. 690,684 for additional details concerning the exact construction of the standards 24 and 26.

A clamp member 30 is formed at either end of base member 28 to secure the base member 28 to the vertical standards 24 and 26. As is described in my aforesaid copending U.S. patent application, the vertical height at which the base member 28 is clamped to each of the standards 24 and 26 may be adjusted so that base member 28 is in a horizontal, level position even where the terrain below the vertical standards 24 and 26 is uneven and not of the same elevation.

As seen in FIGURES 1, 2 and 3, the base member 28 has secured to it two resilient shaft supporting members 32 and 34. The shaft supporting members 32 and 34 are preferably formed of spring steel and are rigidly fixed to the base member 28 as by welding. As is best shown in FIGURE 3, the shaft supporting members 32 and 34 extend upwardly and forwardly in the direction of belt travel (indicated by the arrow in FIGURE 3) from the base member 28. A roller shaft 38 (FIGURE 2) having flattened end portions 38a is secured to the forwardly extending ends of supporting members 32 and 34 by bolts 40. A return reach idler roller 36 which supports the conveyor belt return reach 20 is journaled for rotation on roller shaft 38. It should be noted at this point that within the scope of the present invention the roller shaft 38 could as an alternative be non-rotatably secured to the roller 36 in which case bearing members (not shown) would preferably be fixed to the forwardly extending ends of supporting members 32 and 34 to journal the roller shaft for rotation relative to the members 32 and 34.

As shown in FIGURES 1, 5, 6 and 7, the troughing roller assembly 14 is in many respects similar in construction to the return reach roller assembly 22. As best shown in FIGURE 1, a spreader or base member 42 having lateral slots 44 in each of its ends is supported by the wire ropes 12. Bolts 46 passing through the ends of spreader member 42 serve to clamp the slotted ends of the member 42 onto the wire ropes 12 to positively fix the member 42 with respect to the ropes 12. The spreader member 42 serves the dual purpose of providing a base member for the troughing idler roller assembly 14 and maintaining the wire ropes 12 at a predetermined fixed lateral dimension at the troughing roller assembly 14. As in the case of the base member 28, the spreader or base member 42 has resilient shaft supporting members 48 and 50 secured thereto and extending upwardly and forwardly therefrom in the direction of belt travel. The resilient shaft supporting members 48 and 50 are preferably formed of spring steel and are rigidly secured to the base member 42 as by welding.

A roller shaft 58 is nonrotatably secured to the forwardly extending ends of members 48 and 50 as may be seen in FIGURES 1 and 5. Three conveying reach rollers 52, 54 and 56 are rotatably mounted on the roller shaft 58 to form the troughing idler roller unit. The shaft 58 may be formed of rigid material in which case there will be a predetermined trough to the idler roller assembly. The shaft 58 may also be formed of flexible material such as a wire rope which provides for a trough in the form of a catenary. If a flexible shaft is utilized, bearings may be secured to the ends of resilient shaft supporting members 48 and 50 so that the flexible shaft may rotate relative to the supporting members 48 and 50. In that case, the rollers 52, 54 and 56 will be nonrotatably secured to the flexible shaft.

Bearing in mind the structural details of the embodiments described in connection with FIGURES 1, 2, 3, and 5, the operation of these embodiments which provides self-training to the conveyor belt will become readily apparent. FIGURE 4, which is a diagrammatic representation of one of the resilient shaft supporting members 32, illustrates the action of the resilient shaft supporting members when the conveyor assembly is in operation. As seen in FIGURE 4, the supporting member assumes a position A under normal operating conditions of the conveyor belt. As described in conjunction with FIGURE 4, the action of the supporting member 32 is a portion of the return reach idler assembly 22 but the action of this member is equally applicable to the action of members 48 and 50 of the troughing roller assembly 14.

As viewed in FIGURE 4 the direction of belt travel will be from left to right or from base member 28 toward the end of the shaft supporting member 32. So long as the belt is operating under normal conditions both members 32 and 34 will assume a position equivalent to position A of FIGURE 4. If the weight upon the belt should vary slightly the resilient shaft supporting member 32 may flex to rise up slightly or be depressed slightly under the varying weights thus giving a resilient, cushioning effect to the roller assembly. So long as the belt 16 remains centered on the idler roller 36, both resilient shaft supporting members 32 and 34 will support half the load of the shaft and will, therefore, assume similar positions. If, however, the belt should tend to move from the center of roller 36 toward one of the resilient supporting members 32 or 34, that supporting member will be forced to carry more of the shaft weight than does the other supporting member. For example, as viewed in FIGURE 2, if the belt return reach 20 should move to the left toward member 32 then member 32 will be forced to carry more of the weight of the belt return reach 20 than does member 34. In such a situation, the resilient supporting member 32 will assume a position corresponding to position B of FIGURE 4. Meanwhile, the resilient supporting member 34, now bearing less of the weight of the shaft 38, will not remain in its normal position indicated by A in FIGURE 4 but rather will move upwardly under the reduced weight to a position corresponding to position C of FIGURE 4. From this action, it will be seen that the end of member 32 to which the shaft end portion is connected, when in position B, is advanced in the direction of belt travel while the end of member 32, when in position C, is retarded against the direction of belt travel. Accordingly, the axis of shaft 38 will be canted in a direction which tends to return the belt 20 toward the center of roller 36.

Figures 6, 7:
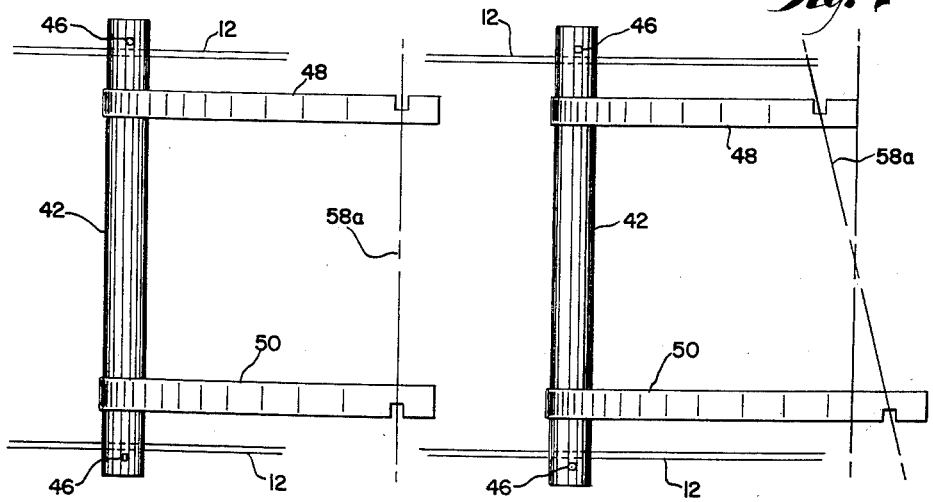
FIGURE 6 is a top plan view of the troughing idler roller support of FIGURE 1 with the rollers and shaft removed.
FIGURE 7 is a top plan view of the troughing idler roller support, similar to FIGURE 6, illustrating the belt training action provided by the roller assembly.

FIGURES 6 and 7, which are top plan views of the troughing idler roller supports of FIGURE 1 with the rollers and shaft removed, further show the action of the resilient shaft supporting members 48 and 50 in tending to train the conveyor belt to track a true course. As seen in FIGURE 6 the supporting members 48 and 50 are in a normal position corresponding to position A of FIGURE 4. In this situation the conveying reach of the belt is approximately centered between the supporting members 48 and 50. FIGURE 7 shows a top plan view of the resilient supporting members 48 and 50 after the conveyor belt troughed conveying reach has moved toward the member 50 and thus misaligned itself. Under these circumstances the supporting member 50 has been depressed to correspond to position B of FIGURE 4. Meanwhile, the supporting member 48 having been relieved of a portion of the load which it had been carrying, rises to a position corresponding to position C of FIGURE 4. As a result of this action the axis 58a of the shaft 58, which had been parallel to base member 42 in FIGURE 6, is now canted relative to the base member as indicated in FIGURE 7. This canting of axis 58a causes the conveying reach of the belt to be returned toward the center of the desired course in a direction toward supporting member 48.

It will be appreciated that since the supporting members 32 and 34 and 48 and 50 are resilient, a small deviation of the conveyor belt 16 from its desired track will not cause the supporting members to immediately assume positions corresponding to position B or position C of FIGURE 4. Rather, the supporting members 32, 34, 48 and 50 will assume positions proportional to the amount of deviation of the betl and therefore proportional to the amount of weight difference supported by the respective pairs of supporting members. Thus, if the belt moves only slightly out of line, a corrective action supplied by roller assemblies 14 or 22 will be relatively slight. If, on the other hand, the deviation of the conveyor belt is appreciable, the corrective action supplied will be proportionately greater.

It will be further noted that when the axes of the idler rollers are canted as a result of the action of the resilient support members 32, 34, 48 or 50, the end of the axis advanced in the direction of belt travel is also lowered slightly while the end of the axis retarded against the direction of belt travel is raised slightly. In some instances, depending upon the belt loading characteristics, this action may aid in the belt retraining effect. However, it has been found that the self training results obtained by lateral belt movement due to raising or lowering the ends of the roller axis are not as pronounced when compared with the self training results obtained by advancing one end of the axis in the direction of belt travel and retarding the other end of the axis against the direction of belt travel. However, with my improved self training roller assemblies both types of self training results are obtained to thereby provide a self training roller assembly having improved self training properties.

Figure 8:
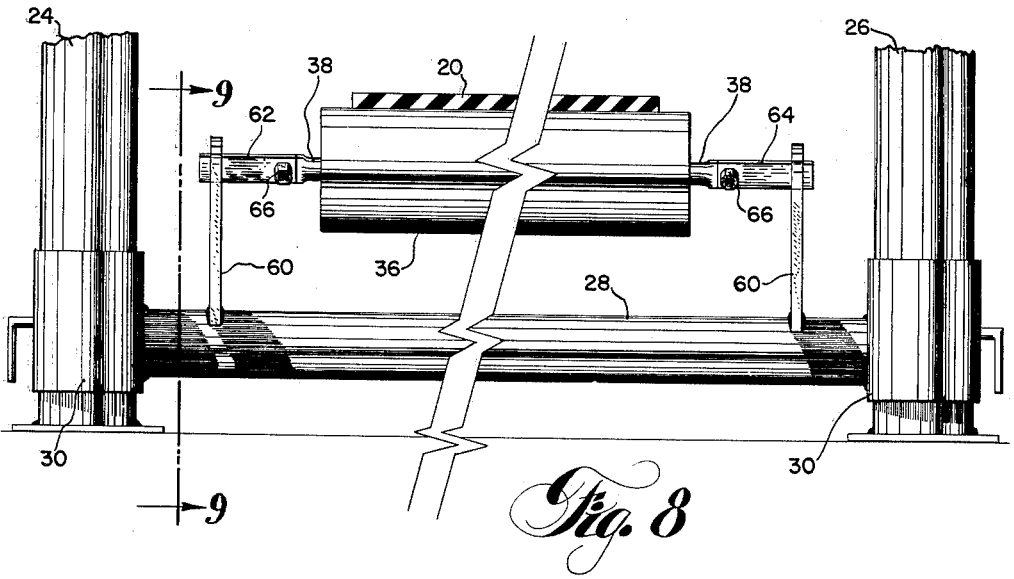
FIGURE 8 is an enlarged elevation, similar to FIGURE 2, of a portion of the supporting standard showing details of an alternate form of return reach idler roller assembly.
Figure 9:
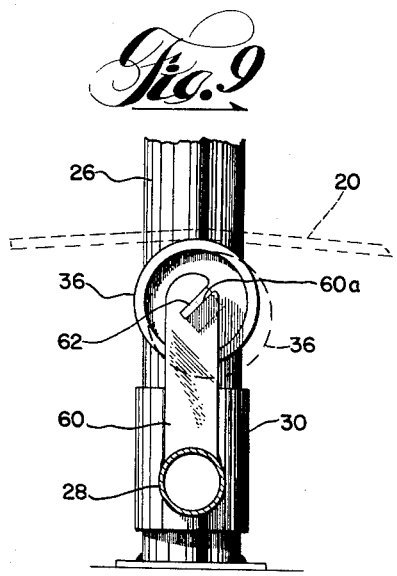
FIGURE 9 is a partial section taken along line 9—9 of FIGURE 8.

FIGURES 8 and 9 show a second embodiment of a return reach idler roller assembly built in accordance with the principles of the present invention. FIGURE 8, which is a view similar to FIGURE 2, shows the vertical standards 24 and 26 connected by cross member or base member 28. In FIGURE 8 the base member 28 also includes a pair of upstanding slotted arms 60. These arms 60 are rigid and are rigidly secured to the base member 28 as by welding. An idler roller 36 is disposed between arms 60. Roller 36 has a shaft 38 upon which it is rotatably mounted. Roller 36 and shaft 38 are identical to that described in connection with FIGURE 2. Resilient shaft supporting members 62 and 64 are fixed to the ends of shaft 38 as by bolts 66. The supporting members 62 and 64 are preferably formed of flat pieces of spring steel. These pieces of spring steel are elongated in shape and are axially aligned with the shaft 38.

As is best seen in FIGURE 9, the upstanding arms 60 have slots 60a formed in them. The slots 60a in arms 60 are of the shape of the cross section of shaft supporting members 62 and 64. The slots 60a are disposed at an acute angle to the horizontal, preferably an angle of about 45°, as shown in FIGURE 9. The slots 60a receive the ends of supporting members 62 and 64 to thereby support the shaft 38 and roller 36 between arms 60.

As is also seen in FIGURE 9 the slots 60a are disposed such that their top portions are advanced in the direction of belt travel (indicated by the arrow in FIGURE 9) whereas their lower portions are retarded against the direction of belt travel. Since the members 62 and 64 resiliently support shaft 38, so long as the belt is centered on roller 36 and therefore so long as the weight of the belt is equally distributed along roller 36 the roller will be maintained in the position shown in full lines in FIGURE 9. If, however, the belt should move toward one end or the other of roller 36, the increased weight on one of the resilient supporting members 62 or 64 will cause it to flex downwardly. For example, as shown in FIGURES 8 and 9, if the return reach 20 of the belt 16 should move to the left in FIGURE 8 toward resilient member 62, resilient member 62 would be required to support more weight than resilient member 64. In that case, the end of resilient member 62 which supports shaft 38 would be forced downwardly and forwardly in the direction of belt travel until the end of the roller 36 supported by resilient member 62 would assume the position shown in phantom lines in FIGURE 9. Thus, the end of the shaft 38 of the roller 36 nearest member 62 would be advanced in the direction of belt travel. Since the resilient member 64 would now be required to support less weight, it would move upwardly and rearwardly against the direction of belt travel and further shift the axis of roller 36. It will be appreciated that the small dimension of the cross section of resilient members 62 and 64 causes flexure of these members more readily in a direction parallel to the small dimension than in a direction parallel to the large dimension. Thus, the angle to the horizontal at which slot 60a is disposed will control the amount of corrective action produced by a given size of the resilient supporting members 62 and 64.

Figure 10:
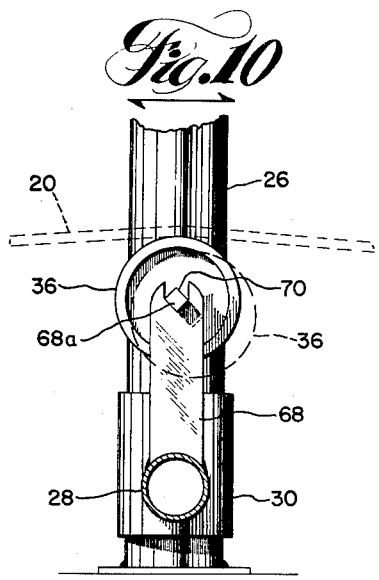
FIGURE 10 is a view similar to FIGURE 9 showing still another modification of the return reach idler roller assembly construction.

As seen in FIGURE 10, a modified version of the embodiment of FIGURES 8 and 9 that is self training in both directions of belt movement is shown. As seen in FIGURE 10 the resilient shaft supporting member 70 is square in cross section. Except for this change, the resilient members and the shaft 38 and roller 36 are identical to that shown in FIGURE 8. The upstanding forms 68 of FIGURE 10 are secured to the base member 28 as are the arms 60. Arms 68 contain polygonal slots 68a which are of the shape shown in FIGURE 10. Slot 68a is formed to receive the end of the resilient shaft supporting member 70 in a manner such that the diagonals of the square cross section of member 70 are disposed in a vertical and a horizontal direction. The function of the configuration of FIGURE 10 is very similar to that of the configuration of FIGURES 8 and 9. When the belt is moving in a direction toward the right of FIGURE 10, if the belt move stoward either end of the roller 36 that end of the roller will be forced into a position indicated by the phantom lines in FIGURE 10 due to the flexing of resilient support members 70. This configuration makes use of the fact that since the belt is moving, it will exert a downward and sideward force upon the roller as viewed in FIGURE 10. If the belt should move to the left as viewed in FIGURE 10, then the sideward component would be in the opposite direction as viewed in FIGURE 10 and the inner portions of the resilient member 70 would flex in the opposite direction.

The present invention provides for economically constructed idler roller assemblies which may be utilized to train the conveyor belt of an endless conveyor assembly along the desired course. By substituting spring steel components in certain strategic locations on a conveyor idler roller assembly, a highly efficient self training idler assembly has been formed. The spring steel components have been substituted so that the entire length of the resilient shaft supporting member is utilized in flexing and accordingly, when only small amounts of corrective action are required, the spring steel members may be of relatively short length. Further, the spring steel members suspend the idler rollers so that the idler rollers may contact the belt but are not frictionally inhibited from their corrective action by contacting other portions of the fixed conveyor assembly.

This invention provides for an idler roller which is self training and yet is so economical to construct that every roller assembly in the entire conveyor assembly may be provided with self training tendencies. The idler rollers of this invention, while possessing self training characteristics, also have a tendency to recenter themselves and maintain a neutral roller position when no belt deviation exists and therefore no corrective action is required.

According to the provisions of the patent statute, I have explained the principle, preferred construction and mode of operation of my invention and have illustrated and described what I now consider to represent its best embodiments. However, I desire to have it understood that, within the scope of the appended claims, the invention may be practiced otherwise than as specifically illustrated and described.

I claim:

1. A conveyor belt idler roller assembly comprising a rigid base member disposed transversely of a predetermined conveyor course and extending entirely across said conveyor course, a roller shaft having outwardly extending end portions disposed in laterally offset spaced relation to said base member and extending entirely across said conveyor course, a roller mounted on said shaft between said end portions for supporting a conveyor belt trained for movement along said conveying course, a pair of elongated, resilient shaft supporting members each having a supported base end portion and an unsupported shaft end portion, each of said shaft supporting member base end portions fixed to one end of said base member, said shaft supporting members each extending upwardly from said base member and extending forwardly in the direction of said belt movement, one of said shaft supporting members being disposed on each side of said belt, each of said shaft supporting member shaft end portions secured to one of said shaft end portions to resiliently support said shaft, said shaft supporting members constructed and arranged so that upon lateral deviation of said conveyor belt from its predetermined course said shaft supporting members flex unequal amounts to move said supporting member shaft end portions in substantially vertical planes thereby causing said roller shaft to cant relative to said base member in a manner tending to return said belt toward said predetermined course.

2. A conveyor belt idler roller assembly comprising a rigid base member including a pair of spaced apart upwardly extending slotted arms fixed thereto disposed transversely of a predetermined conveyor course, a roller shaft having outwardly extending end portions disposed in spaced relation to said base member, a roller mounted on said shaft between said end portions for supporting a conveyor belt trained for movement along said conveying course, a pair of elongated, resilient shaft supporting members each having a supported base end portion and an unsupported shaft end portion, each of said shaft supporting member base end portions received and supported by the slotted arms of said base member, each of said supporting member shaft end portions secured to one of said shaft end portions to resiliently support said shaft, said shaft supporting members constructed and arranged so that upon lateral deviation of said conveyor belt from its predetermined course said shaft supporting members flex unequal amounts thereby causing said roller shaft to cant relative to said base member in a manner tending to return said belt toward said predetermined course.

3. A conveyor belt idler roller assembly comprising a rigid base member including a pair of spaced apart upwardly extending slotted arms fixed thereto disposed transversely of a predetermined conveying course, a roller shaft having outwardly extending end portions disposed in spaced relation to said base member, a roller mounted on said shaft between said end portions for supporting a conveyor belt trained for movement along said conveying course, a pair of elongated resilient shaft supporting members each having a supported base end portion and an unsupported shaft end portion, said shaft supporting members having rectangular cross sections, said base member slotted arms having rectangular slots to nonrotatably receive said shaft supporting members, each of said shaft supporting member base end portions positioned in said rectangular slots and supported by said upstanding arms, each of said shaft supporting member shaft end portions secured to one of said shaft end portions to resiliently support said shaft, said shaft supporting members constructed and arranged so that upon deviation of said conveyor belt from its predetermined course said shaft supporting members flex unequal amounts thereby causing said roller shaft to cant relative to said base member in a manner tending to return said belt toward said predetermined course.

4. A conveyor belt idler roller assembly comprising a rigid base member including a pair of upwardly extending slotted arms fixed thereto disposed transversely of a predetermined conveying course, a roller shaft having outwardly extending end portions disposed in spaced relation to said base member, a roller mounted on said shaft between said end portions for supporting a conveyor belt trained for movement along said conveying course, a pair of elongated, resilient shaft supporting members each having a supported base end portion and an unsupported shaft end portion, said shaft supporting members having substantially square cross sections, said base member slotted arms having polygonal slots formed therein such that each of said shaft supporting member base end portions is received in one of said slots and supported by said upstanding arms in a manner that said shaft supporting member square cross sections are disposed with one of the diagonals of said square being in a horizontal plane, each of said shaft supporting member shaft end portions secured to one of said shaft end portions to resiliently support said shaft, said shaft supporting members constructed and arranged so that upon deviation of said conveyor belt from its predetermined course said shaft supporting members flex unequal amounts thereby causing said roller shaft to cant relative to said base member in a manner tending to return said belt toward said predetermined course.

5. A flexible side frame conveyor assembly comprising a pair of wire rope supports trained along a predetermined conveyor course, a supporting standard for supporting said wire rope supports, an endless conveyor belt having a conveying reach and a return reach, said belt conveying reach trained for movement along said course between said wire rope supports, said belt return reach trained for movement in a direction opposite to said conveying reach direction of movement along said course between said wire rope supports, a spreader member secured to said rope supports transversely of said conveying course to maintain said rope supports at a fixed distance from each other, a first pair of elongated, resilient shaft supporting members each having a supported base end portion and an unsupported shaft end portion, each of said first shaft supporting member base end portions supported by said spreader member, said shaft supporting members extending upwardly from said spreader member and extending forwardly in said conveying reach direction of movement, a first roller shaft having outwardly extending end portions disposed in spaced relation to said spreader member, a plurality of rollers mounted on said first shaft between said end portions to support said conveyor belt conveying reach, each of said first shaft supporting member shaft end portions secured to one of said first shaft end portions to resiliently support said first shaft, said supporting standard including a rigid base member disposed transversely of said conveyor course, a second pair of elongated, resilient shaft supporting members each having a supported base end portion and an unsupported shaft end portion, each of said second shaft supporting member base end portions supported by said supporting standard base member, a second roller shaft having outwardly extending end portions disposed in spaced relation to said base member, a roller mounted on said second shaft between said end portions to support said conveyor belt return reach, each of said second shaft supporting member shaft end portions secured to one of said second shaft end portions to resiliently support said second shaft, said shaft supporting members constructed and arranged so that upon deviation of said conveyor belt conveying reach from its predetermined course each of said first pair of shaft supporting members flex unequal amounts thereby causing said first roller shaft to cant relative to said spreader member in a manner tending to return said conveying reach toward said predetermined course and so that upon deviation of said conveyor belt return reach from its predetermined course each of said second pair of shaft supporting members flex unequal amounts thereby causing said second roller shaft to cant relative to said base member in a manner tending to return said return reach toward said predetermined course.

6. A flexible side frame conveyor assembly comprising a pair of wire rope supports trained along a predetermined conveyor course, an endless conveyor belt trained for movement along said course between said wire rope supports, a spreader member secured to said rope supports transversely of said conveyor course to maintain said rope supports at a fixed distance from each other, a pair of elongated, resilient shaft supporting members each having a supported base end portion and an unsupported shaft end portion, each of said shaft supporting member base end portions fixed to said spreader member, said shaft supporting members extending upwardly from said spreader member and extending forwardly in said conveyor belt direction of movement, a roller shaft having outwardly extending end portions disposed in spaced relation to said spreader member, a plurality of rollers mounted on said shaft between said end portions to support said conveyor belt, each of said shaft supporting member shaft end portions secured to one of said shaft end portions to resiliently support said shaft, said shaft supporting members constructed and arranged so that upon deviation of said conveyor belt from its predetermined course said shaft supporting members flex unequal amounts thereby causing said roller shaft to cant relative to said spreader member in a manner tending to return said belt toward said predetermined course.

7. A flexible side frame conveyor assembly comprising a pair of wire rope supports trained along a predetermined conveyor course, a supporting standard for supporting said wire rope supports, an endless conveyor belt trained for movement along said course between said wire rope supports, said supporting standard including a base member disposed transversely of said conveyor course and extending entirely across said conveyor course, a pair of elongated, resilient shaft supporting members each having a supported base end portion and an unsupported shaft end portion, each of said shaft supporting member base end portions supported by said supporting standard base member, said shaft supporting members each extending upwardly from said base member and extending forwardly in the direction of said belt movement, one of said shaft supporting members being disposed on each side of said belt, a roller shaft having outwardly extending end portions disposed in laterally offset, spaced relation to said base member and extending entirely across said conveyor course, a roller mounted on said shaft between said end portions to support said belt, each of said shaft supporting member shaft end portions secured to one of said shaft end portions to resiliently support said shaft, said shaft supporting members constructed and arranged so that upon deviation of said conveyor belt from its predetermined course said shaft supporting members flex unequal amounts to move said supporting member shaft end portions in substantially vertical planes thereby causing said roller shaft to cant relative to said base member in a manner tending to return said belt toward said predetermined course.

References Cited in the file of this patent

UNITED STATES PATENTS

| | | |
|---|---|---|
| 1,423,528 | Kendall | July 25, 1922 |
| 2,277,402 | Hoeck | Mar. 24, 1942 |
| 2,451,394 | Klein | Oct. 12, 1948 |
| 2,773,257 | Craggs et al. | Dec. 4, 1956 |
| 2,875,886 | Lo Presti et al. | Mar. 3, 1959 |
| 2,896,774 | Long et al. | July 28, 1959 |